Dec. 29, 1970   R. G. GRIFFIN   3,550,450
GOLF METER

Filed Sept. 17, 1968   3 Sheets-Sheet 1

INVENTOR
RALPH G. GRIFFIN
By Emory G. Grobb Atty

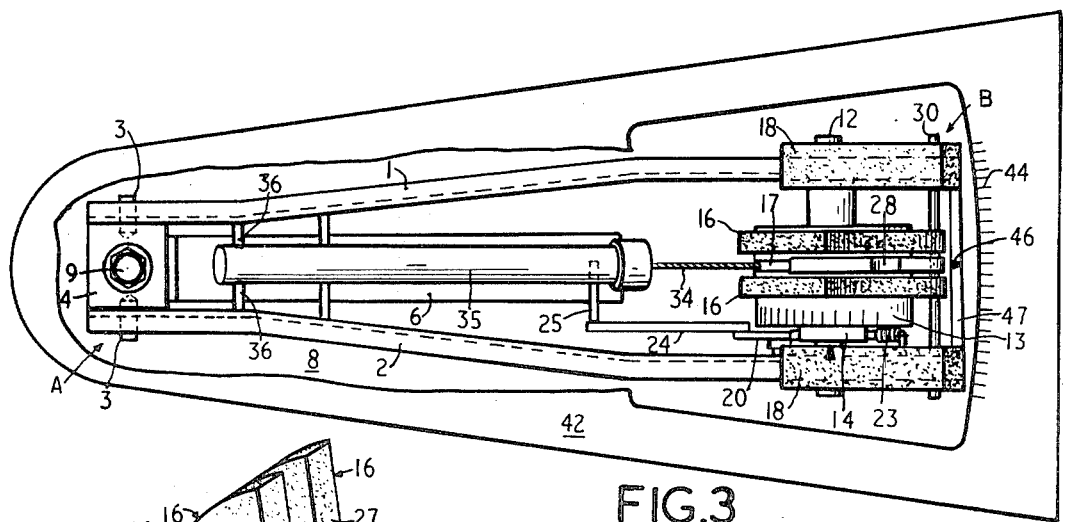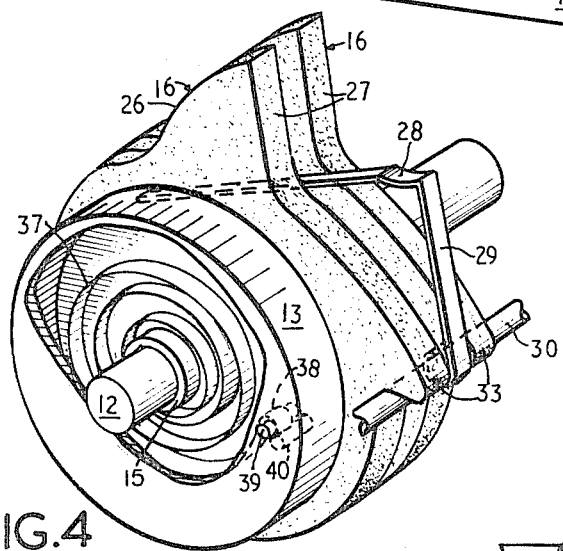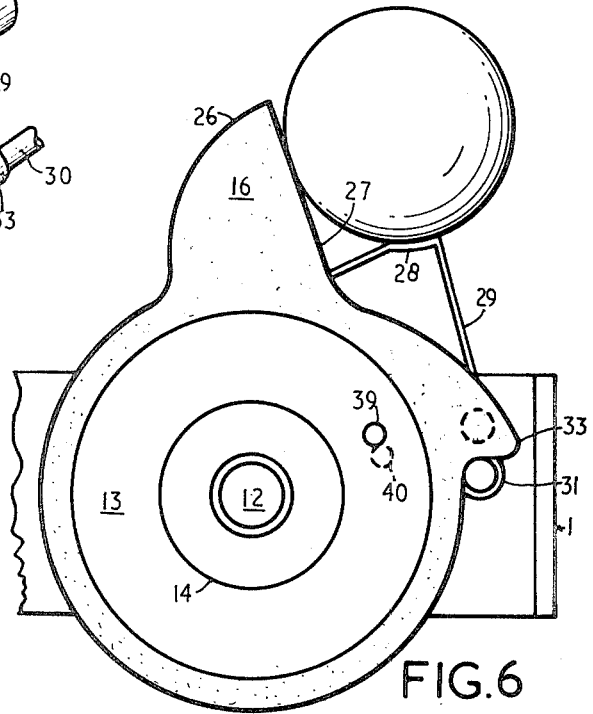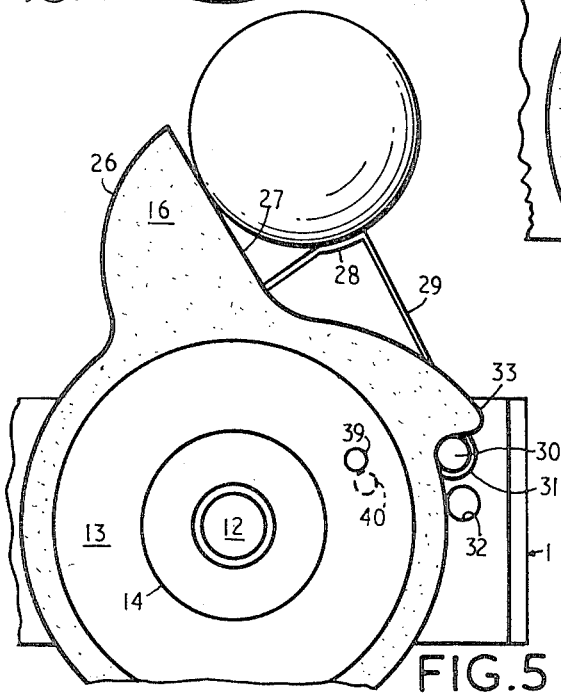

Dec. 29, 1970  R. G. GRIFFIN  3,550,450
GOLF METER

Filed Sept. 17, 1968  3 Sheets-Sheet 3

INVENTOR
RALPH G. GRIFFIN

United States Patent Office 3,550,450
Patented Dec. 29, 1970

3,550,450
GOLF METER
Ralph Gillespie Griffin, 45 Archbold Road, Roseville, New South Wales, Australia
Filed Sept. 17, 1968, Ser. No. 760,272
Claims priority, application Australia, Sept. 19, 1967, 27,414/67
Int. Cl. G01l 5/06; A63b 69/36
U.S. Cl. 73—380                                    9 Claims

ABSTRACT OF THE DISCLOSURE

A golf meter incorporating means to support a golf ball, to record the distance a golf ball would travel under playing conditions in still air and whether in the process of making a stroke the direction of the ball has deviated to the right or to the left of the line of flight intended by the player.

---

This invention has been devised to provide a golf meter which will indicate:

(a) The distance a golf ball would travel under playing conditions in still air when hit with various types of golf clubs.
(b) Whether in the process of making a stroke the direction of the ball has deviated to the right or to the left of the line of flight intended by the player.

In effect the meter enables a player to ascertain the correct stance he should adopt, and the swing he should apply to achieve the best results of which he is capable.

This golf meter comprises an arm assembly mounted on a base by one end by means permitting universal movement of the other (free) end of the arm assembly and means to bias the arm assembly to a horizontal position. A tee assembly including a ball supporting cup is rotatably mounted on a shaft on the free end of the arm assembly, said tee assembly being rotatable in a vertical plane in the direction of flight of a ball played from the cup and means to return the tee assembly to its original position by rotating it in the opposite direction. A drum rotatably mounted on the shaft has distance indicator markings thereon. Means are incorporated to rotate the drum with the tee assembly in the flight direction of rotation. Releasable means hold the drum when its rotating movement with the tee assembly ceases and means return the drum to its initial position when the holding means are released. Other means are incorporated to indicate deviation of the arm assembly to the right or to the left of a central playing position and the degree of such deviation.

One embodiment of the invention with several modifications of the means to measure the energy imparted to the tee is described with reference to the annexed drawings wherein:

FIG. 3 is a plane with part of the cover broken away to expose the meter;

FIG. 4 is a perspective view of the tee assembly and the drum;

FIG. 5 is a side elevation of the tee assembly;

FIG. 6 is a side elevation of the tee assembly, and

Figure 1:
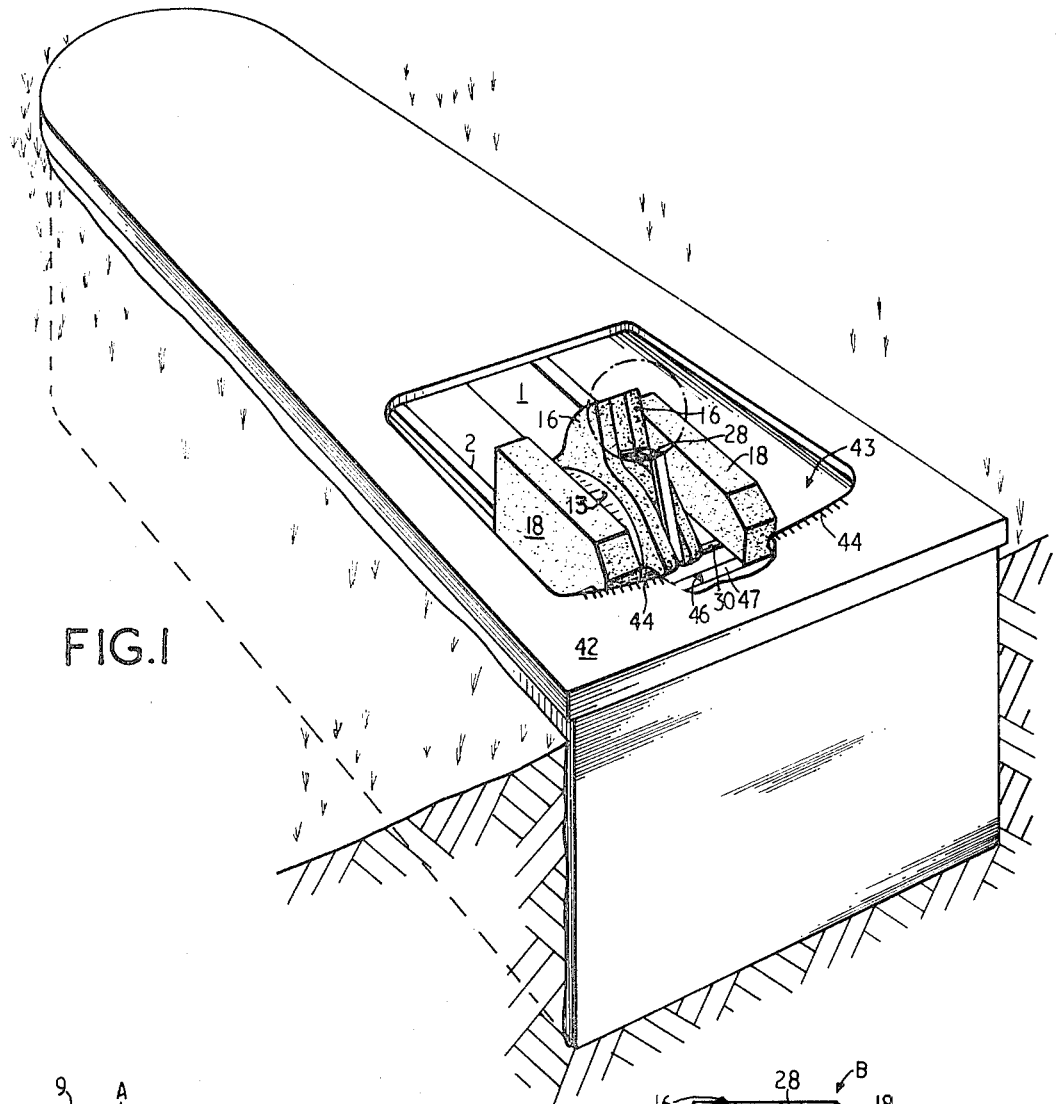
FIG. 1 is a perspective view of the meter cover showing the necessarily exposed parts of the meter.
Figure 2:
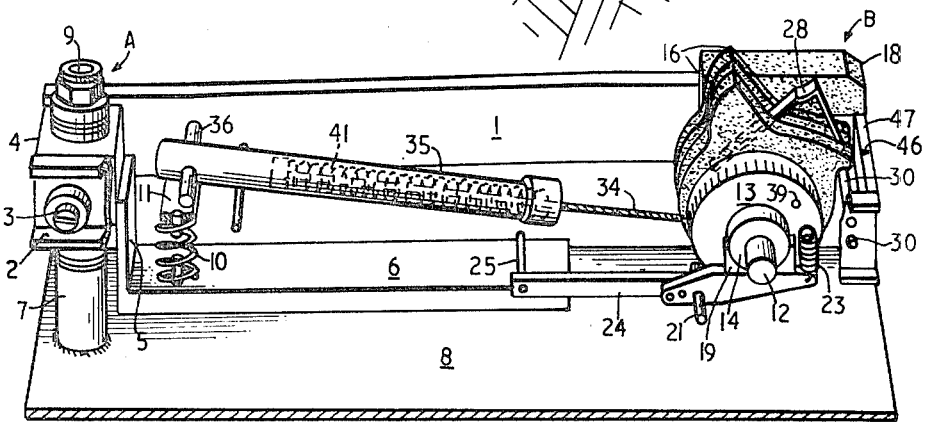
FIG. 2 is a perspective view of the meter with the cover and one arm removed.

The golf meter comprises a pair of tee carrying arms 1-2 mounted at one end A on stub axles 3 fixed on a head member 4 in a manner to permit the arms to swing vertically. The head member 4 incorporates a platform 5 which has a brake release arm 6 lying between and below the arms 1-2. The head member assembly is supported on a column 7 fixed to a base 8. The assembly is mounted on a journal pin 9 on the column 7 for part rotation in a horizontal plane. The arms 1-2 are biased to a horizontal position by a compression spring 10 mounted on the brake release arm 6 and butted against a tie bar 11 connecting the arms 1-2.

A shaft 12 fixed in and extending between the arms 1-2 adjacent the other end B has mounted thereon a peripherally marked distance indicator drum 13 incorporating a coaxial brake drum 14. A hub 15 rotatably mounted on the shaft 12 has fixed thereon a pair of tee members 16 separated by a sheave groove 17 formed in the periphery of the hub 15. Protective rubber cushions 18 are mounted on the ends B of the arms 1-2 juxtaposed the assembly on the shaft 12.

A brake block 19 positioned to engage the brake drum 14 is supported by a lever 20 fulcrumed as at 21 on bracket (not shown) on the arm 2. The brake block is applied to the brake drum 14 by a tension spring 23 connected to one end of the lever 20 and to the arm 2. The other end of the lever 20 has a rod 24 fixed thereto and an arm 25 on the rod 24 is positioned to be engaged by the brake release arm 6.

The pair of tee members 16 are made of a reinforced elastomeric material each having a part of a ball supporting cup 26 formed thereon. The ball supporting faces 27 combine with an arcuately shaped part 28 of a leaf spring 29 disposed between the tee members 16 to form with the faces 27 a three point support for the ball. The spring 29 is anchored by one end to a stop bar 30 removably mounted in and extending between the arms 1-2; the other end rests on the hub 15 and lies over the groove 17 therein. Two positions 31-32 for mounting the stop bar 30 are provided in the arms 1-2. The position 31 (see FIG. 5) is used when clubs up to a three iron are played and the position 32 (see FIG. 6) is used for irons between four and eight. The tee members 16 have stop lugs 33 thereon positioned to abut the bar 30 and movement of the bar 30 as aforesaid is arranged to achieve in the order of 10° change in the play position of the faces 27 of the tee members and the part 28 of the spring 29. This adjusting movement is necessary to accommodate the different angles of the faces of the several clubs that may be used. The lugs 33 are biased against the bar 30 by a cable 34 wound on and anchored by one end to the sheave 17, the other end of the cable being secured to a compression spring 41 housed in a spring casing 35 pivotally mounted as at 36 between the arms 1-2.

A spiral spring 37 in anchored by its center end to end of the hub 15 adjoining the indicator drum 13. The outer end of the spring 37 has an eye 38 thereon whereby it is anchored on a pin 39 on the distance indicator drum 13. When the tee is partly rotated by playing a ball a drive pin 40 fixed to the hub 15 in engaging position behind the pin 39 rotates the drum 13 against the friction of the brake block 19. When the momentum imparted to the tee members 16 by playing a ball is overcome by the compression of the spring 41 in the casing 35 such spring reverses the movement of the tee members 16 which return to zero position against the stop bar 30. Brake block 19 holds the indicator drum 13 in the length of drive indicating position against the tension created in the spiral spring 37 thus enabling a length of drive reading to be taken. The indicator drum 13 is returned to zero under the influence of the spring 37 by depressing the arms 1-2 to engage the arm 25 of the rod 24 with the brake release arm 6.

A cover 42 fixed to the base 8 encloses the device. The cover has an opening 43 in its top providing access to the tee and a view of the distance indicator drum 13. The cover along the leading edge of the opening 43 has graduation markings 44 thereon. A center line pointer mark 46 on a plate 47 fixed to the end B of the arms 1–2 juxtaposed the markings indicates a movement of the head member 4 about journal pin 9 when a stroke played causes the tee assembly to deviate to the right or to the left of the line of flight intended by the player. The cushions 18 prevent damage to the meter which could result from playing a faulty stroke.

Slave markers may be incorporated in a manner to be moved by the arm assembly to indicate on the markings 44 any deviation of the arm assembly to the right or to the left resulting from a player making such movement.

Although a general construction of meter has been described, it is to be understood that the energy imparted to the tee can be absorbed and measured by elastic, pneumatic, hydraulic, electric or electronic means or any suitable combination of them. Right or left movements of the arm assembly may be recorded in the same manner.

An example of measuring the energy imparted to the tee by electric means to record the distance a golf ball will travel are described hereinafter with reference to FIG. 7 of the drawings.

Figure 7:
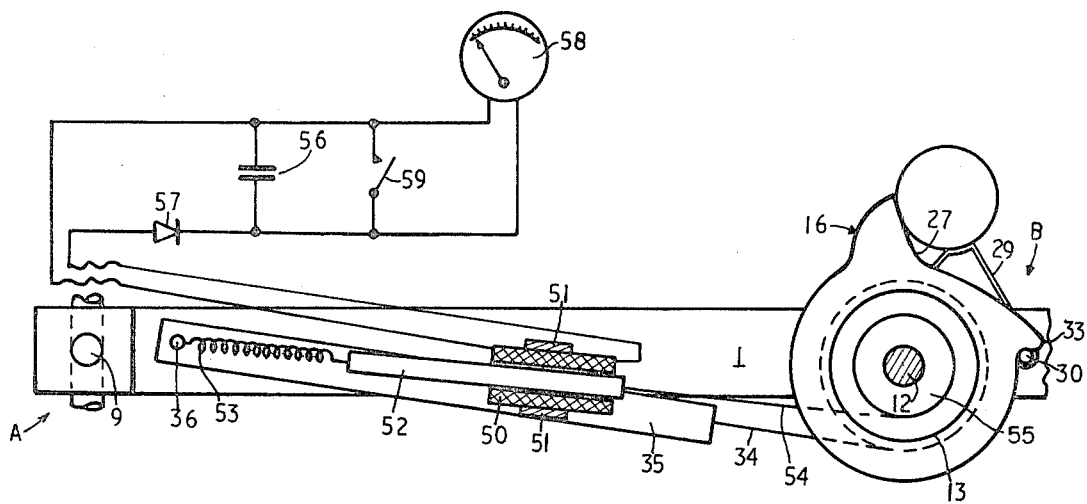
FIG. 7 is a fragmentary side elevation illustrating an electric means to measure the energy imparted to the tee.

In FIG. 7 the apparatus is only shown schematically as the apparatus itself is the same as described above except that the distance indicator markings on the drum 13 are optional and may be omitted. The electric indicating means are connected with the indicator drum mentioned above and as shown in FIG. 7 are actuated by the drum 13.

The arrangement in FIG. 7 makes use of the fact that electrical energy is generated if a permanent magnet is moved through a coil.

In FIG. 7 the tee members 16 are held in the rest position by a spring housed in the casing 35 and connected with the tee members by the cable 34. The tee members 16 are coupled as described above to the indicator drum 13 so that the drum is rotated when the tee members are rotating counter clockwise and is maintained in this position after the tee members have returned to their initial position, until the brake on the drum is released.

Connected with the drum 13 is a hub 55 and the periphery of the hub is connected to a cable 54 which is wound onto the hub on rotation of the indicator drum.

Fixed to one of the arms of the arm assembly by bracket 51 is a coil of electric wire 50 and a permanent magnet 52 is arranged inside the coil for free sliding movement therein. One end of the magnet is connected with the cable 54 while the other end is connected with a light spring 53 which is anchored at a common pivot point 36.

In the rest position of the apparatus the spring 53 will hold the permanent magnet in such a position that a major part of the magnet projects from the coil 50 adjacent the spring 53.

When the indicator drum is operated on operation of the tee members 16 a pull is exerted on the cable 54 and therefore the magnet 52 is moved longitudinally through the centre of the coil 50 and induces therein an electric voltage. This electric voltage is now used as an indication of the force exerted on the tee member 16. As the voltage is only present during movement of the permanent magnet through the coil provision has to be made to derive from this voltage an indication which will remain permanently or at least for a certain time. This can be achieved by using an instrument which writes a record of the voltages in graph form or by an arrangement as shown in FIG. 7.

In accordance with the circuit shown in FIG. 7 the voltage induced in the coil 50 will charge a condenser 56 via a rectifier 57. The rectifier 57 prevents the discharge of the condenser over the coil and the voltage thus stored in the condenser 56 can then be indicated on a static volt meter 58 connected with the condenser. The scale of the volt meter 58 can be calibrated directly in distant measurements as the amount of voltage charged on condenser 56 will be equivalent to the force applied to the golf ball and thus the tee member 16. This force again is the equivalent of the distance which is covered by the golf ball. When the indicator drum 13 is released as described above a switch 59 will be closed at the same time and this switch will discharge the condenser 56 so that the indicator instrument 58 returns to zero.

The foregoing example describes only one way by which an indication is given through electrically operated instruments, and modifications of these arrangements can be made within scope of the invention.

I claim:
1. A golf meter which will indicate:
   (a) the distance a golf ball would travel under playing conditions, in still air when hit with various types of golf clubs,
   (b) whether in the process of making a stroke the direction of the ball has deviated to the right or to the left of the line of flight intended by the player, said meter comprising an arm assembly mounted on a base by one end by means permitting universal movement of the other free end of the arm assembly and means to bias the arm assembly to a horizontal position, a tee assembly including a ball supporting cup rotatably mounted on a shaft on the free end of said arm assembly, said tee assembly being rotatable in a vertical plane in the direction of flight of a ball played from the cup and first resilient means which stores energy due to the rotation of the tee assembly in the direction of ball flight and expends said energy to return the tee assembly to its original position by rotating it in the opposite direction, a drum rotatably mounted on said shaft, said drum having distance indicator markings thereon, means to rotate the drum with the tee assembly in the flight direction of rotation, releasable means to hold the drum when its rotating movement with the tee assembly ceases and second resilient means which stores energy due to the rotation of the tee assembly in said direction of ball flight and expends said energy to return the drum to its initial position when the holding means are released, and means to indicate deviation of the arm assembly to the right or to the left of a central playing position and the degree of such deviation.

2. A golf meter as claimed in claim 1 wherein the arm assembly comprises a pair of arms mounted at one end on stub axles projecting from opposite sides of a head member, the mounting permitting the arms to swing vertically, said head member being supported on a column fixed to a base and mounted on a journal pin for part rotation in a horizontal plane, said arms being biased to a horizontal position by a compression spring incorporated in the assembly.

3. A golf meter as claimed in claim 1 wherein the tee assembly comprises a hub rotatably mounted on the shaft on the free end of the arm assembly, said hub having fixed thereon a pair of spaced apart tee members, said tee members being made of a reinforced elastomeric material, each tee member having a part of a ball supporting cup formed thereon, a leaf spring disposed between said pair of tee members to form with the cup parts a three point support for a ball.

4. A golf meter having a tee assembly as claimed in claim 1 wherein the tee members have stop lugs thereon juxtaposed a stop bar adjustably mounted on the arm assembly, and wherein the stop lugs are biased against the stop bar by a cable wound on a sheave formed in the periphery of said hub between said tee members, said cable having one end anchored thereto and the other end secured to a compressing spring constituting said first resilient means in a spring casing pivotally mounted on the arm assembly.

5. A golf meter as claimed in claim 1 wherein the means to rotate the drum having the distance markings thereon in the flight direction comprise a drive pin on the tee assembly in engaging position behind a lug on said drum, and wherein the means to return the drum to its initial position when the holding means are released comprise a spiral spring constituting said second resilient means which is anchored by its center to the tee assembly and by its outer end to the drum.

6. A golf meter as claimed in claim 1 wherein the means to hold the drum having the distance markings thereon comprise a brake drum fixed to the distance indicating drum, a brake block supported by a lever fulcrumed on the arm assembly and applied to the brake drum by a tension spring connected to said lever and to the arm assembly, said brake being released by a rod connected to said lever, said rod having an arm positioned to be engaged by a release arm forming part of the arm assembly and actuated by depressing the arm assembly below its horizontal position.

7. A golf meter as claimed in claim 1 wherein the means to indicate deviation of the arm assembly to the right or to the left comprise a pointer mark on the arm assembly juxtaposed graduation marking on a stationary member forming part of the meter.

8. A golf meter as claimed in claim 11 wherein the means to record the distance (a) is electric and is actuated by the said drum.

9. A golf meter which will indicate:
  (a) The distance a glof ball would travel under playing conditions, in still air when hit with various types of golf clubs,
  (b) Whether in the process of making a stroke the direction of the ball has deviated to the right or to the left of the line of flight intended by the player,
said meter comprising an arm assembly mounted on a base by one end by means permitting universal movement of the other free end of the arm assembly and means to bias the arm assembly to a horizontal position, a tee assembly including a ball supporting cup rotatably mounted on a shaft on the free end of said arm assembly, said tee assembly being rotatable in a vertical plane in the direction of flight of a ball played from the cup and resilient means which stores energy due to the rotation of the tee assembly in the direction of ball flight and expends said energy to return the tee assembly to its original position by rotating it in the opposite direction, a drum rotatably mounted on said shaft, said drum having distance indicator markings thereon, means to rotate the drum with the tee assembly in the flight direction of rotation, releasable means to hold the drum when its rotating movement with the tee assembly ceases and means to return the drum to its initial position when the holding means are released, means to indicate deviation of the arm assembly to the right or to the left of a central playing position and the degree of such deviation, said arm assembly comprising a pair of arms mounted at one end on stub axles projecting from opposite sides of a head member, the mounting permitting the arms to swing vertically, said head member being supported on a column fixed to a base and mounted on a journal pin for part rotation in a horizontal plane, said arms being biased to a horizontal position by a compression spring incorporated in the assembly.

References Cited
UNITED STATES PATENTS

| | | | |
|---|---|---|---|
| 1,682,059 | 8/1928 | Backus | 73—381 |
| 1,857,588 | 5/1932 | Doll | 273—185 |
| 2,240,691 | 5/1941 | Drachenberg et al. | 73—379 |
| 3,181,366 | 5/1965 | Callaro | 73—381 |

RICHARD C. QUEISSER, Primary Examiner

E. J. KOCH, Assistant Examiner

U.S. Cl. X.R.

273—185